J. M. KIRACOFE.
Corn Planter.
No. 102,017.
Patented April 19, 1870.
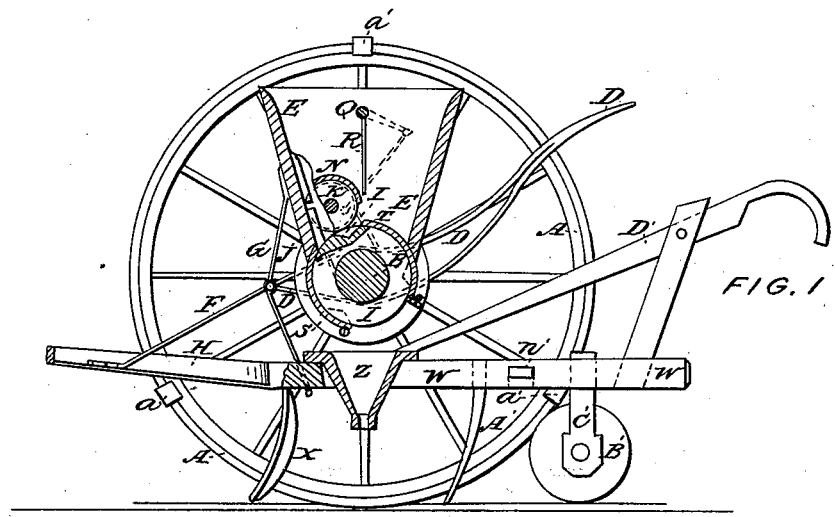
FIG. 1
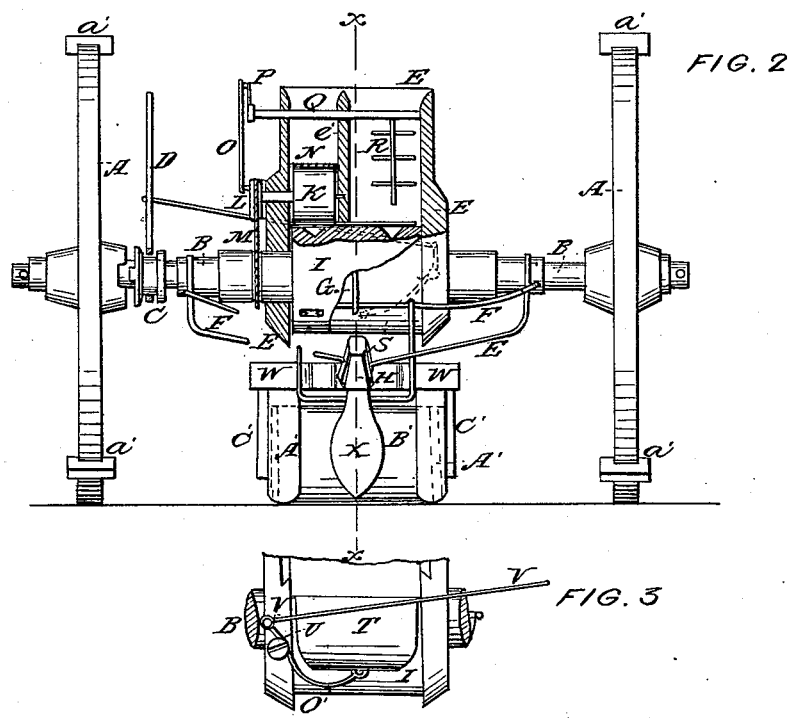
FIG. 2
FIG. 3
WITNESSES:
Chas Nida
Jno T Brooks
INVENTOR:
Jas M. Kiracofe
Munn & Co
attys

United States Patent Office.

JAMES M. KIRACOFE, OF MOUNT SOLON, VIRGINIA.

Letters Patent No. 102,017, dated April 19, 1870

IMPROVEMENT IN CORN-PLANTERS.

The Schedule referred to in these Letters Patent and making part of the same.

*To all whom it may concern:*

Be it known that I, JAMES M. KIRACOFE, of Mount Solon, in the county of Augusta and State of Virginia, have invented a new and useful Improvement in Corn-Planters; and I do hereby declare that the following is a full, clear, and exact description thereof, which will enable others skilled in the art to make and use the same, reference being had to the accompanying drawings forming part of this specification, in which—

Figure 1 is a vertical longitudinal section of my improved corn-planter, taken through the line x x, fig. 2, parts being broken away to show the construction.

Figure 2 is a front view of the same, parts being broken away to show the construction.

Figure 3 is a detail rear view of the dropping-cylinder.

Similar letters of reference indicate corresponding parts.

My invention has for its object to furnish an improved corn-planter, which shall be so constructed and arranged as to drop the corn accurately and regularly, and cover it and drop the fertilizer at the same time with the corn; and It consists in the construction and combination of the various parts of the machine, as hereinafter more fully described.

A are the wheels, one of which is rigidly attached to the axle B, and the other is provided with a clutch, C, sliding upon the axle B, by means of which it may be made to revolve with said axle, or loosely upon it, as may be desired.

The clutch C is provided with a lever, D, extending back into such a position that it may be conveniently reached and operated by the driver.

E is the hopper, the sides of which project downward and have holes formed through them, through which passes the axle B, so that the said hopper may ride upon the said axle.

The hopper E is kept in a vertical position by being connected with the frame or brace-rods F by a rod or rods G.

The rear part of the frame F is connected with the axle B, and its forward end with the tongue H, so that the said axle and its attachments may be drawn by the said tongue.

The hopper E is divided into two compartments by the partition e', as shown in fig. 2, one to receive the corn and the other to receive the fertilizer.

I is the dropping-cylinder which forms the bottom of the hopper E, and is formed upon or attached to the middle part of the axle B.

The cylinder I has two sets of cups or recesses formed upon it, one to receive the desired amount of the corn, and the other to receive the desired amount of the fertilizer, and which drop the said corn and the said fertilizer together upon the ground.

To the forward side of the compartment of the hopper E, in which the fertilizer is placed, is secured a brush, J, which rests upon the dropping cylinder I to prevent any more of the fertilizer than enough to fill the cups from passing out with the said cylinder.

In the lower part of the compartment of the hopper E, in which the corn is placed, is pivoted a small roller, K, made of gum-elastic or other suitable material to prevent any more corn than enough to fill the cups from passing out with the cylinder I.

One of the journals of the roller K passes out through the side of the hopper E, and has a pulley, L, attached to it, around which and around the axle B passes a belt, M, so that the roller K may be revolved by the revolution of the axle B.

The upper side of the roller K is covered with a shield, N, to prevent the corn from working in between the said roller and the forward side of the hopper E.

To the outer side of the pulley L is attached a crank-pin, to which is pivoted the lower end of the connecting-rod O, the upper end of which is pivoted to the crank P formed upon or attached to the end of the shaft Q.

The shaft Q works in bearings in the upper part of the hopper E, and to that part of it that passes through the compartment of said hopper in which the fertilizer is placed is attached a stirrer or agitator, R, by the movement of which the fertilizer will be agitated, so as to pass down freely to the dropping-cylinder.

The agitator R may be formed by attaching short cross-bars to a vertical bar, the upper end of which is attached to the said shaft Q.

S is an apron attached to the lower part of the hopper E, and fitting upon the forward side of the dropping cylinder I to keep the corn and fertilizer in the cups, until they have reached the proper position to drop into the spout by which they are conducted to the ground.

T is a shield sliding upon the dropping-cylinder I, which, when pushed up, covers the upper side of the dropping-cylinder I, and prevents any of the corn or fertilizer from entering the cups of said cylinder.

When the shield is drawn down the corn and fertilizer are allowed to pass into the dropping-cups.

To the lower edge of the shield T is pivoted one end of the bent lever U, which is pivoted to the rear part of the machine, and the other end of which is connected with the clutch-lever D by the connecting-rod V, so that, when the lever D is operated to throw the wheel out of gear for turning or passing from place to place, the same movement will raise the shield T, and prevent the corn and fertilizer from being dropped until the lever D is again operated to throw the said wheel into gear, which movement again uncovers the said cups.

W are the plow-beams, the forward ends of which are rigidly attached to the rear end of the tongue H, and the rear parts of which are connected and held in their proper relative positions by a cross-bar, $w'$.

To the forward parts of the beams W, or to the rear part of the tongue H, is attached the plow X by which the furrow to receive the corn and fertilizer is opened, and to the beams W, in the rear of the conductor spout Z, are attached the plows A' by which the seed and fertilizer are covered.

The conductor-spout Z, the mouth or upper end of which is made wide or flaring, is placed between and secured to the forward parts of the beams W, in such a position as to receive the corn and fertilizer from the dropping-cylinder, and conduct them to the furrow.

B' is the covering-roller, the journals of which revolve in standards C' adjustably attached to the rear parts of the plow-beams W, so that the roller B' may serve both as a roller to press down the soil upon the covered corn and fertilizer, and as a gauge to regulate the depth at which the plows run in the ground.

D' are the handles, which are attached to the plow-beams W in the ordinary manner.

To the faces of the wheels A are attached markers $a'$, by which the ground is marked midway between the rows and in a line with the hills, so that, to insure the corn being planted in perfect check row, all that is necessary is to place a marker, when starting, in the mark opposite the last hill of the previous row.

Having thus described my invention,

I claim as new and desire to secure by Letters Patent—

1. The roller K, pulley L, and band M, in combination with the hopper E and axle B, substantially as herein shown and described and for the purpose set forth.

2. The sliding shield T, connected with and operated by the clutch-lever D, when used in combination with the dropping-cylinder I of a corn-planter, substantially as herein shown and described and for the purpose set forth.

3. An improved corn-planter formed by the combination of the wheels A, axle B, clutch C, clutch-lever D, hopper E $e'$, dropping-cylinder I, roller K, pulley L, band M, connecting-rod O, shaft Q, stirrer R, apron S, frame F, tongue H, plow-beams W, plows X A', conductor-spout Z, adjustable covering and gauge-roller B', sliding shield T, bent lever U, and connecting-rod V, with each other, said parts being arranged and operating substantially as herein shown and described and for the purpose set forth.

JAMES M. KIRACOFE.

Witnesses:
   JOS. A. THOMAS,
   JOHN H. RAMBY.